United States Patent
Stanchfield et al.

(10) Patent No.: US 7,266,301 B2
(45) Date of Patent: Sep. 4, 2007

(54) INTERFERENCE RESISTANT REPEATER SYSTEMS INCLUDING CONTROLLER UNITS

(75) Inventors: Todd M. Stanchfield, Saugus, CA (US); Ernest J. Leggett, Northridge, CA (US); Edward A. Mangler, Palmdale, CA (US)

(73) Assignee: Speakercraft, Inc., Riverside, CA (US)

( * ) Notice: Subject to any disclaimer, the term of this patent is extended or adjusted under 35 U.S.C. 154(b) by 684 days.

(21) Appl. No.: 10/655,809

(22) Filed: Sep. 5, 2003

(65) Prior Publication Data

US 2005/0053378 A1 Mar. 10, 2005

(51) Int. Cl.
*H04B 10/00* (2006.01)

(52) U.S. Cl. ............... 398/126; 398/106; 398/112; 398/37; 398/189; 455/500; 455/20

(58) Field of Classification Search ............... 398/115, 398/126, 106, 187, 112; 455/21, 500, 603; 359/142, 154

See application file for complete search history.

(56) References Cited

U.S. PATENT DOCUMENTS

| | | | | |
|---|---|---|---|---|
| 4,809,359 A | * | 2/1989 | Dockery ............... | 398/126 |
| 4,850,040 A | * | 7/1989 | Teich et al. ............ | 398/112 |
| 5,301,355 A | * | 4/1994 | Koinuma et al. ....... | 455/21 |
| 5,602,664 A | * | 2/1997 | Doyle .................. | 398/126 |
| 5,982,519 A | * | 11/1999 | Martnelli et al. ....... | 398/187 |
| 6,400,480 B1 | * | 6/2002 | Thomas ................ | 398/106 |
| 6,895,252 B2 | * | 5/2005 | Pugel .................. | 455/500 |

\* cited by examiner

*Primary Examiner*—Kenneth Vanderpuye
*Assistant Examiner*—Li Liu
(74) *Attorney, Agent, or Firm*—Hogan & Hartson LLP

(57) ABSTRACT

A repeater unit is provided that includes a receiver module and a controller unit. The receiver module is responsive to an infrared signal. The controller unit is adapted to determine whether a signal based on the infrared signal corresponds to a remote control signal.

13 Claims, 7 Drawing Sheets

INTERFERENCE RESISTANT REPEATER SYSTEMS INCLUDING CONTROLLER UNITS

BACKGROUND

The field of the invention generally relates to infrared control systems that implement repeater or extension systems, and more specifically to components thereof that are interference resistant.

Infrared ("IR") Control Systems

IR control systems can allow a user to control many conventional audio and video components, such as televisions and stereo equipment as well as more recently developed technologies such as Digital Versatile Disc players (DVD players), and electronic video recorders. Increasingly, use of such systems has expanded to control home and office fixtures such as lighting; mechanical systems such as heating, ventilation and air conditioning; and appliances such as automated coffee machines and dishwashers.

A wide variety of IR remote controls are typically used to control such IR control systems. Such IR remote controls are generally product or component specific depending upon the manufacturer. Traditional narrow-band tuned IR remote control systems employ a handheld remote control that includes a transmitter and a stationary receiver.

The transmitter typically includes a modulating circuit and a light emitting diode. The modulating circuit determines the frequency at which the light emitted from the diode is modulated. The light emitting diode emits short pulses of IR light when the diode is energized, and the wavelength of the IR light is based on the physical properties of the light emitting diode. These short pulses of IR light are encoded with data.

The receiver typically includes a detector that detects incoming IR light signals emitted from the light emitting diode, and an amplifier that is "tuned" or configured to respond to the modulation frequency of the light emitted from the light emitting diode. The amplifier amplifies the output of the detector, which converts the incoming modulated IR light to a corresponding modulated electrical signal, before transmitting that output signal to control circuitry. The control circuitry then demodulates the data stream and controls operation of the device.

Manufacturers typically employ IR control systems that are tuned on a product-by-product basis to a chosen narrow-band frequency. In most cases, the IR light is modulated using a carrier frequency of 38 KHz, 56 KHz, or 455 KHz. There are also a variety of remote control code protocols, and most protocols use different spacing and timings of carrier-modulated infrared signal bursts to encode commands and data. As such, a tremendous amount of variation exists among control systems.

Extension or Repeater Systems

One problem with conventional control systems resides in the inability to control a component outside the line-of-sight or beyond the transmission range of the component's IR receiver, for example, when the component is in another room.

To address this problem, IR extension or repeater systems, such as that disclosed in U.S. Pat. No. 4,509,211 to Michael S. Robbins, which is hereby incorporated by reference, have been developed. IR extension or repeater systems can allow the user to control one or more various components by providing a remote link to the component even though the component is remotely located or outside the line-of-sight or range of the transmitter. IR extension or repeater systems ideally output the same coded signal received by the system.

A typical IR extension or repeater system generally comprises a receiver that can detect and amplify the IR signal, and a transmitter that "repeats" or retransmits the signal, for example, into another room. As such, the IR extension or repeater system "extends" or "repeats" the IR signal.

Interference and Plasma Displays

Infrared (IR) "noise" can interfere with a signal from the remote control. Traditional sources of IR noise include ambient lighting, such as sunlight, or artificial light sources, such as compact fluorescent lamps. These sources have been recognized in the art for some time, and solutions have been developed to address noise from these sources.

Recently, however, development of new technologies has created new sources of IR interference or "noise." Plasma displays and Liquid Crystal Displays (LCDs) for television are two of the new IR noise sources that have recently hindered the performance of IR extension or repeater systems. Plasma/LCD displays continuously emit significant amounts of IR radiation, and are often in close proximity to extension or repeater systems. Noise generated by plasma/LCD sources or "plasma/LCD noise" is similar to bursts of carrier-based IR signals emitted by the transmitter of a remote control. In many cases, this noise closely resembles a valid remote signal making it difficult for the IR receiver to reject noise generated by plasma sources. As such, IR receivers can pass such noise as it does valid remote signals whenever direct or reflected signals from a plasma display are received.

In addition, when plasma/LCD noise and a remote control signal are simultaneously received by a component, the component may not properly decipher the signal since the presence of the plasma noise can disrupt decoding of the command signal, and the component to be controlled is unable to recognize the remote command that corresponds to that signal. As a result, the component will fail to respond to the coded transmission, which prevents the component from being controlled as requested by the user.

Accordingly, there is a need to provide an improved extension or repeater systems that reduces or eliminates one or more of the problems set forth above. There is also a need for interference resistant extension or repeater systems that are operable in the presence of IR noise or interference.

SUMMARY

An aspect of the present invention provides a repeater unit that includes a receiver module and a controller unit.

In one embodiment, the receiver module is responsive to an infrared signal, and the controller unit is adapted to determine whether a signal based on the infrared signal corresponds to a remote control signal.

Another aspect of the invention relates to an infrared repeater system that includes a remote control device that generates a remote control signal, a repeater unit, and at least one component responsive to the remote control signal. The repeater unit can include at least one receiver module responsive to an infrared signal that comprises at least one of a noise input and the remote control signal, a controller unit, and an amplifier. The at least one receiver module is responsive to the infrared signal. The controller unit is adapted to determine whether a signal, such as an electrical signal, based on the infrared signal corresponds to the remote control signal. The controller unit generates an output signal that corresponds to the remote control signal if the controller unit determines that the signal based on the infrared signal corresponds to the remote control signal. The amplifier amplifies the output signal generated by the controller unit to generate an amplified output signal. The at least one component is responsive to this amplified output signal which corresponds to the remote control signal.

BRIEF DESCRIPTION OF DRAWINGS

The following discussion may be understood with reference to the various views of the drawings, described in summary below, which form a part of this disclosure.

DETAILED DESCRIPTION

Figure 1:
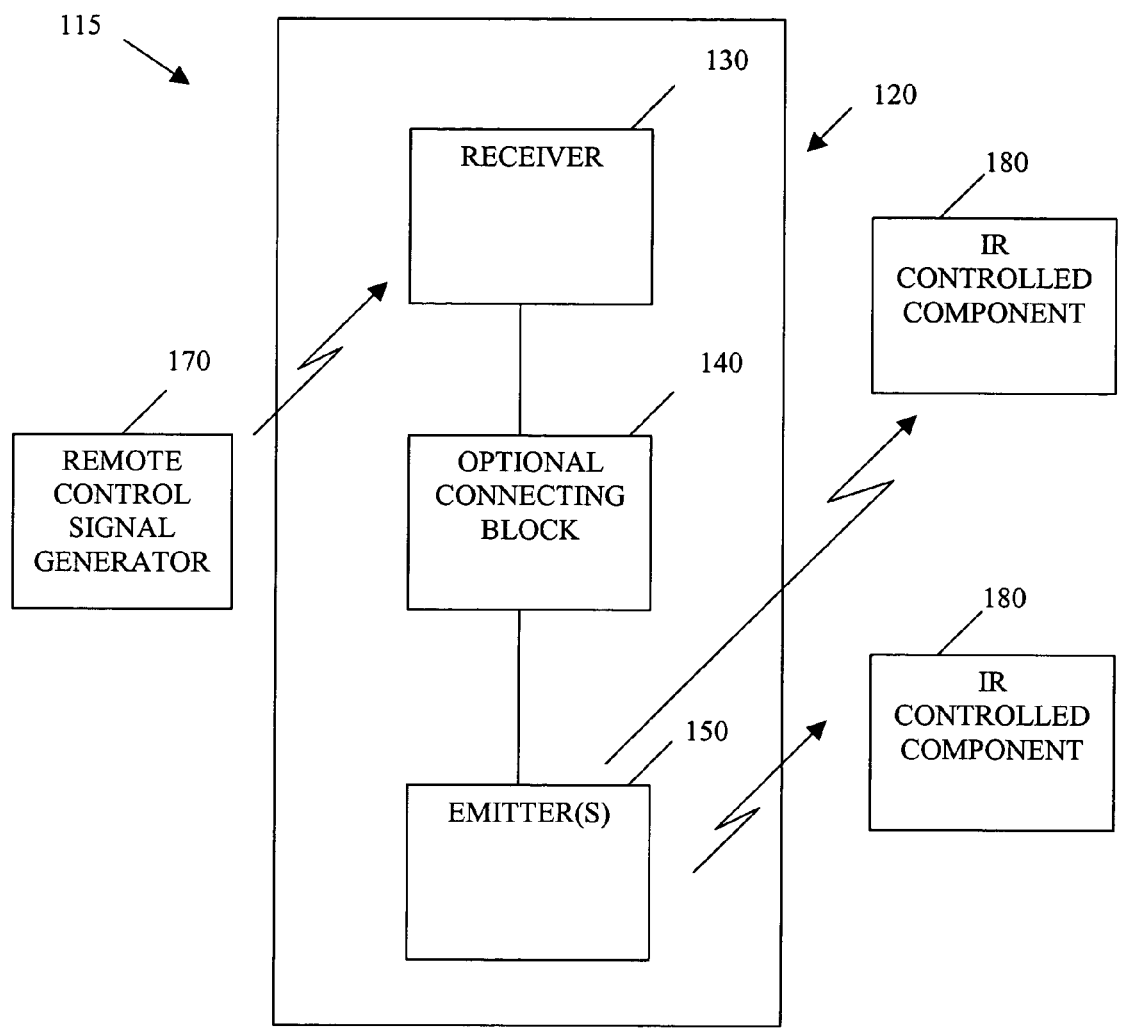
FIG. 1 is block diagram of an embodiment of an infrared control system that includes an infrared extension or repeater system.

In the following detailed description of the embodiments, reference is made to the accompanying drawings that show, by way of illustration, specific embodiments in which the invention may be practiced. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled. Like numbers refer to like elements throughout.

Aspects of the present invention can provide IR extension or repeater systems that are resistant to interference from stray IR radiation or "noise." The repeater system uses a controller that distinguishes a valid remote control signal from plasma/LCDs or other noise, and generates a valid remote control signal.

In one embodiment, an infrared repeater is provided that utilizes one or more receiver modules for signal reception, and a controller that separately analyzes the outputs of each receiver module. The receiver modules can be tuned to a number of different frequencies. The number of combinations of such receiver modules that can be implemented is limited only by the number of different receiver modules. When multiple receiver modules tuned to different frequencies, such as 38 kHz and 56 kHz, are used, the majority of remote control codes are covered. By looking at the outputs of each receiver module separately, less error is introduced.

In an embodiment, the controller monitors the output signal of each module and measures the output pulse widths of the output signal. The controller then determines whether a minimum pulse width duration, that coincides with the duration of carrier bursts that the majority of remote protocols employ, is satisfied before the pulses are considered valid. Once a pulse is considered valid, the controller starts to generate a carrier signal of the remote control command. Because the output of the controller has been delayed during processing, the controller compensates for this delay by continuing carrier signal generation after the modules' output signal has terminated, for a duration equal to the initial processing delay.

In another aspect of the invention, if the particular remote protocol happens to utilize pulse durations or "carrier burst times" that are less than the minimum duration, the controller will nevertheless consider the output pulses of the different receivers to be valid if all of the receiver modules activate their outputs at the same time.

According to another aspect of the invention, the controller regenerates carriers at multiple frequencies in a single output, that enables control of multiple components tuned within a range, such as, 36 kHz-60 kHz.

System Overview

FIG. 1 illustrates an IR control system 115 comprising one or more IR control transmitters, such as an IR remote control signal generator 170, an IR repeater or extension system 120, and one or more IR controlled components 180 to be controlled via the remote control signal generator 170.

The repeater system 115 can be implemented in any situation where it is useful to retransmit a transmitted IR signal, such as an IR control signal or code. An IR control signal is a signal that generally falls within an infrared range of 850 nm to 980 nm.

The IR repeater system 120 comprises an IR receiver 130, an optional connecting block or router component 140, and one or more IR emitters 150 adapted to emit IR light for communication with the IR controlled appliances or components 180. The light emitters 150 may operate at different wavelengths, if desired.

In operation, the IR remote control signal generator 170 emits an IR signal that impinges upon IR receiver 130. The incoming IR signal is a coded signal generated by the IR remote control generator 170, for example, when a particular button on the remote control is pushed. The coded signal includes a combination or series of carrier signals at different durations and spacings from one another. The IR receiver 130 detects the impinging IR signal, converts the IR signal into an electrical signal, amplifies the electrical signal, and transmits or conveys the amplified electrical signal to the connector block 140 if one is utilized.

In this system, the connecting block 140 or router is optional since the IR receiver 130 could be directly coupled to the light emitters 150. When the connecting block is included, the connecting block 140 would typically include a power supply connection adapted to supply power to the IR repeater system 120. The connecting block 140 interconnects various elements of the IR control system 115 including, for example, additional IR receivers 130 in other locations. The connector block 140 receives the electrical signal from the IR receiver 130 and preferably routes the electrical signal to each emitter 150, or alternatively an appropriate emitter 150.

Each emitter 150 converts the electrical signal to an IR signal capable of controlling one or more of the IR controlled components 180. In this manner, the original IR signal from the remote control signal generator 170 can be conveyed in the form of an electrical signal as far as necessary and then reproduced or regenerated into an IR signal capable of controlling a component 180 which the user seeks to control. These components may include, for example, televisions, stereo systems, videocassette recorders, DVD players, CD players, and other components capable of being remotely controlled.

Exemplary Embodiments of Extension or Repeater Systems

Figure 2:
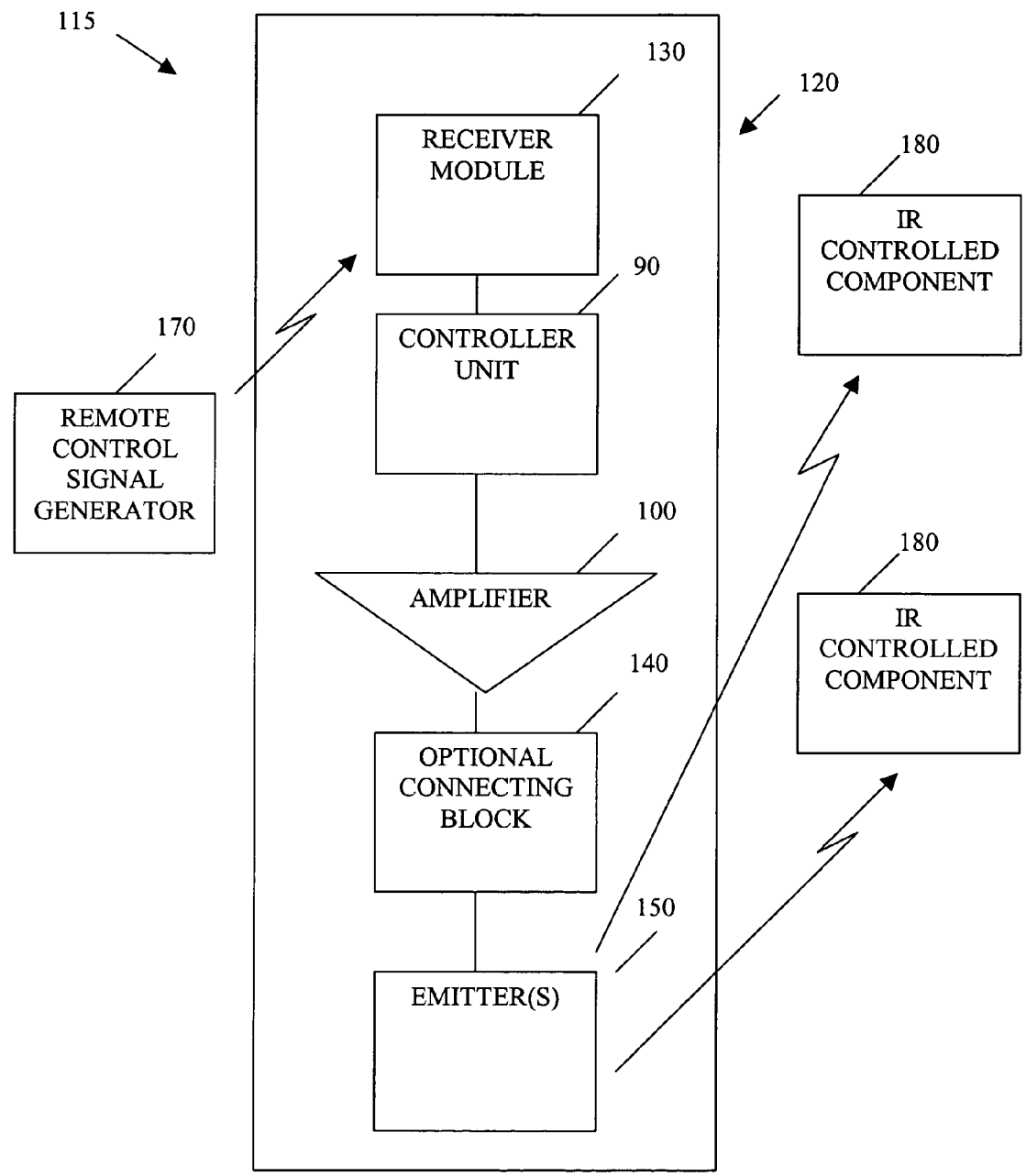
FIG. 2 is a simplified block diagram of an embodiment of an IR repeater system that includes a receiver module, a controller unit, and an amplifier.

FIG. 2 is a simplified block diagram of an embodiment of an IR repeater system 115 that includes a receiver module 130, a controller unit 90, an amplifier 100, an optional connecting block 140, and a plurality of emitters 150.

As used herein, the term "controller unit," and "control unit," refer to logic that processes information to generate a desired result. Examples of types of logic processors that could be utilized to perform the functions of the "controller unit," include, but are not limited to, a microcontroller or microprocessor, software running on a computer system, digital or analog circuitry, and other similar devices adapted to perform the arithmetic, timing and logic functions of the "controller unit."

In FIG. 2, the receiver module 130 is preferably a narrow-band receiver module that is responsive to an infrared input signal having a carrier frequency within its pass band. The infrared signal may comprise, for example, a noise input, the remote control signal, or other IR signals.

A narrowly tuned band-pass filter in the receiver module 130 discriminates between noise and a remote control signal input using linear or analog techniques, but typically does not utilize digital techniques. Thus, the narrowly tuned band-pass filter in the receiver module 130 is effective at discriminating between a remote control signal input and IR light emitted from constant ambient IR noise sources such as compact fluorescent lights (CFLs). However, a problem arises when the IR noise closely resembles the remote control signal, for instance, when the receiver module 130 encounters noise from a plasma display.

In addition, it should be appreciated that the narrow band receiver module 130 is typically an off-the-shelf component manufactured to interface directly with a microprocessor in a component to be controlled. As such, the module 130 includes a demodulator that demodulates the incoming IR input signal and strips away carrier information from the IR input signal to generate a logic level, stripped carrier signal that is output by the receiver module. This stripped carrier signal can then be utilized by the microprocessor in a component to be controlled.

The controller unit 90 comprises logic that processes the stripped carrier output signal of the receiver module 130 to discriminate between a valid remote control signal and a noise input that resembles the remote control signal so that the remote control signal can be detected. The controller unit 90 continuously monitors the incoming IR signal from the receiver module 130, and by using logic determines if the incoming IR signal corresponds to a valid remote-control signal by distinguishing between the noise input and the remote control signal.

To simplify processing, the controller unit 90 may reject incoming IR signals that fail to meet certain criteria.

The logic level, stripped carrier signal from the receiver module 130 includes information such as timing thresholds that the controller unit 90 can analyze to determine whether the output signal is actually a sub-element of a valid remote control command, as opposed to noise. In one embodiment, the controller unit 90 determines whether the infrared signal is valid by determining whether the infrared signal corresponds to one of the remote control signals by measuring the pulse width of the infrared signal, and determining if the pulse width of the infrared signal is greater than a predetermined minimum duration that coincides with a duration of a carrier of one of the remote control signals. More specifically, the controller 90 measures the duration or pulse width of the stripped carrier output signal from the receiver module 130, and determines that the stripped carrier output signal is part of a valid code if the duration is greater than or equal to a predetermined time. Because plasma displays typically generate shorter duration bursts and are generally random in nature, those bursts are effectively rejected by the controller unit 90.

In some embodiments, to determine if the current signal is really part of a greater remote control command signal, the controller unit 90 tracks the recent signal history. A signal can be tested more or less stringently if the controller unit 90 uses recent signal history to adapt to the current ambient noise conditions for a finite period of time.

If the controller unit 90 determines that the infrared signal corresponds to a remote control signal, then the controller unit 90 generates an output carrier signal that corresponds to the remote control signal. The remote control signal can be generated in a variety of ways.

In one embodiment, if the incoming signal is determined to be a valid remote-control signal, the controller unit 90 enables output drive circuitry and replicates the signal. The controller unit 90 continues to monitor the signal in real-time. Because the signal from the receiver module 130 is a logic level signal that does not include carrier information, the controller 90 generates a carrier for a duration that corresponds to the signal output from the receiver module. In other words, a remote control signal is generated by adding a carrier to the signal generated by the receiver module. Thus, the controller unit 90 regenerates the coded signal to provide a replica of the incoming IR signal.

The controller unit 90 may attempt to find any problems with the signal. Because the controller unit 90 has already determined that the incoming signal is a valid remote-control command signal, the controller forgives certain types and certain numbers of errors. However, once too many errors are encountered the drive circuitry of the controller unit 90 is disabled.

The IR repeater system 115 preferably further includes a broadband amplifier 100 that generates the remote control signal by amplifying the output carrier signal generated by the controller unit 90.

A connecting block 140 may optionally be provided that serves as a hub that allows the remote control signal generated by the controller unit to be fanned out to multiple locations. If a connecting block 140 is present, then the amplifier 100 sends the amplified output carrier signal to the connecting block 140, and then the connecting block transmits the amplified output carrier signal to an appropriate emitter 150 or all emitters, if desired. When a connecting block 140 is not utilized, then the amplifier 100 directly transmits the amplified output carrier signal to the appropriate emitter 150.

The amplified output carrier signal drives the appropriate emitter 150 such that a remote control command is emitted by the emitter 150. The IR emitters 150 may comprise, for example, one or more IR light emitting diodes.

Figure 3:
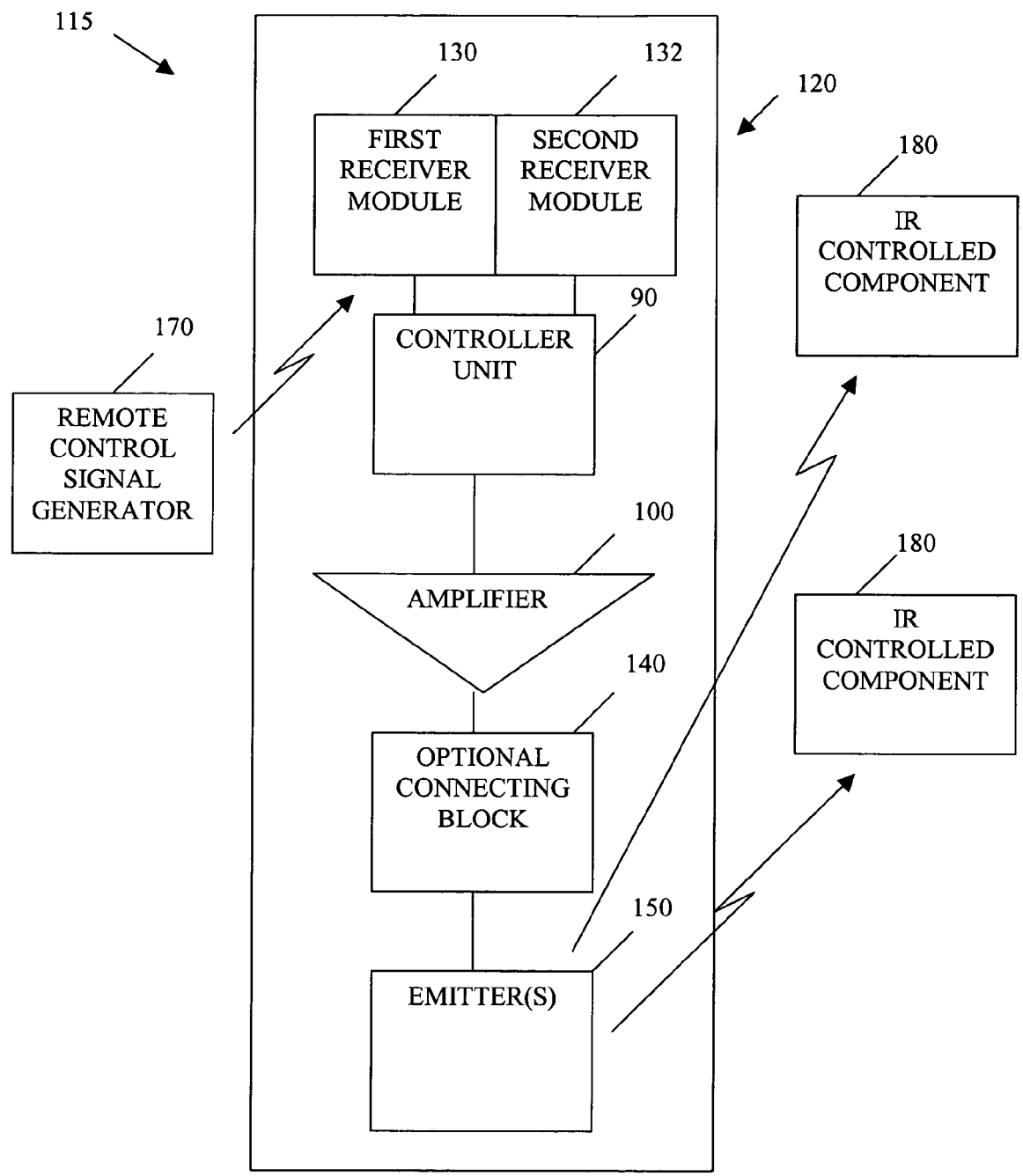
FIG. 3 is a simplified block diagram of an embodiment of an IR repeater system that includes a dual receiver module, a controller unit, and an amplifier.

FIG. 3 is a simplified block diagram of an embodiment of an IR repeater system that includes a dual receiver module 130, 132, a controller unit 90, an amplifier 100, an optional connecting block 140, and a plurality of emitters 150. The description of the amplifier 100, the optional connecting block 140, and the plurality of emitters 150 of FIG. 3 is similar to that provided above, and therefore will not be repeated to avoid redundancy.

In this embodiment, a first narrow-band receiver module 130 is tuned to a first infrared carrier frequency such as 38 kHz, and generates a first output signal if the infrared signal that module 130 receives is within the pass band of a filter (not shown) within the module. Similarly, the second narrow-band receiver module 132 is tuned to a second infrared frequency such as 56 kHz, and generates a second output signal if the infrared input signal that module 132 receives is within its pass band.

An extension or repeater system ideally outputs the same coded signal received by the extension or repeater system. Conventional repeater systems that utilize multiple receiver modules have attempted to combine the respective outputs of the receiver modules using an OR gate, and then send the resultant signal to internal circuitry that regenerates the remote control carrier signal. However, because the delay of each receiver module varies, combining the outputs of the respective receiver modules can result in significant error being introduced since the delay of each receiver module may vary. This approach has proven ineffective since a decoder in the component to be controlled is often unable to decode the remote control command due to the delay errors introduced by each receiver module.

To address this problem, the present embodiment analyzes the output of each receiver module 130, 132 separately. The module that activates first will be the only module that is analyzed by the controller unit 90 unless the module that activates first also terminates first and the second module's output is still activated for a predetermined time, in which case the controller unit will resume analyzing but now with the second module's output for the given signal burst.

The controller unit 90 determines the validity of the infrared signal, by determining if the first output signal corresponds to one of the remote control signals (if the first receiver module activates first), or if the second output signal corresponds to one of the remote control signals (if the second receiver module activates first). If the controller unit 90 determines that either the first output signal or the second output signal is valid, the controller unit 90 then generates one of the remote control signals by adding an infrared carrier signal to either the first output signal or the second output signal. The infrared carrier signal may have either a first frequency or a second frequency, such as 38 kHz or 56 KHz, or a combination thereof.

If receiver module 130 is active first, the controller unit 100 determines if the first output signal corresponds to one of the remote control signals by measuring a pulse width of the first output signal, and determines if the pulse width of the first output signal is greater than a predetermined minimum duration that coincides with a duration of a carrier of one of the remote control signals. Similarly, if the receiver module 132 is active first, the controller unit 100 may determine that the second output signal corresponds to one of the remote control signals, for example, by measuring a pulse width of the second output signal, and determining if the pulse width of the second output signal is greater than a predetermined minimum duration that coincides with a duration of a carrier of one of the remote control signals.

In other embodiments, even though the pulse width of the first output signal or the second output signal is less than the minimum duration, the controller unit 90 nevertheless determines that either the first output signal or the second output signal corresponds to one of the remote control signals if both receiver modules 130, 132 are simultaneously active and generating output signals.

Ideally, a given receiver module responds to input signal at the frequency to which the receiver module is tuned, and the carrier output from the controller 90 is generated at the carrier frequency of the receiver module from which it was received.

In other cases, however, if the signal strength of the input signal is sufficient at a given frequency, then the receiver module may also respond to input signals that are slightly different than the frequency to which the receiver module is tuned. Thus, it is not necessarily true that just because the input signal to the controller 90 comes from a particular receiver module, that signal corresponds to the carrier frequency at which that receiver module is tuned. For example, if the first and second receiver modules are tuned to carrier frequencies of 38 kHz and 56 kHz, respectively, the controller unit 90 can not determine with certainty that a given signal from the first receiver module 130 is a 38 kHz carrier since the output signal from the first receiver module 130 was stripped of its carrier information. In fact, if the input signal to the first receiver module 130 has sufficient signal strength at 56 kHz, then the first receiver module 130 may generate a logic level output that actually corresponds to a 56 kHz carrier, and not a 38 kHz carrier.

To address this problem, in some embodiments the output signal of the controller unit 90 is a remote control signal having a carrier that is based on both the first frequency and the second frequency. For example, the output signal may comprise the result of a logical OR operation performed on the remote control signal having the first frequency such as 38 KHz and the remote control signal having the second frequency such as 56 KHz. Thus, the controller unit 90 simultaneously generates an output signal that logically combines both carrier outputs so that the output signal can control different components controlled by both carrier frequencies.

Figure 4:
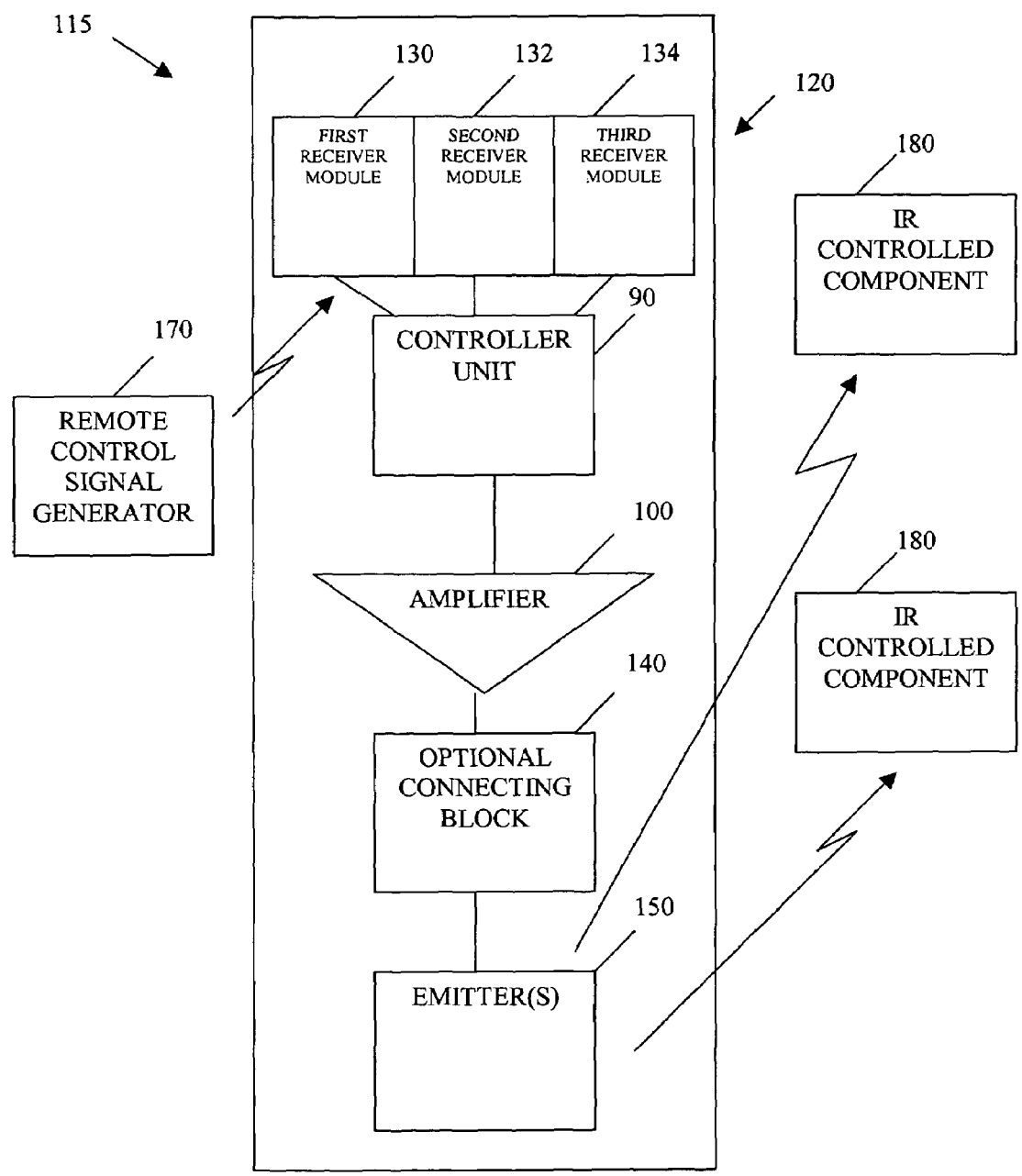
FIG. 4 is a simplified block diagram of an embodiment of an IR repeater system that includes a triple receiver module, a controller unit, and an amplifier.

FIG. 4 is a simplified block diagram of an embodiment of an IR repeater system 115 that includes a triple receiver module, a controller unit, and an amplifier. This embodiment is similar to the embodiment discussed above with respect to FIG. 3, however, in FIG. 4 a third narrow-band receiver module 134 is provided that is tuned to a third infrared frequency such as 455 kHz. The third narrow-band receiver module 134 generates a third output signal if the infrared signal that module 134 receives is within its pass band defined by a bandpass filter (not shown) within module 134. This embodiment operates in a manner similar to those discussed above with respect to FIGS. 2 and 3 except that a greater number of receiver modules is utilized. It should be appreciated that any number of receiver modules could be implemented to increase the range of frequencies over which the repeater system 115 will operate.

Electrical Schematic of an Exemplary Implementation of the IR Receiver

Figure 5:
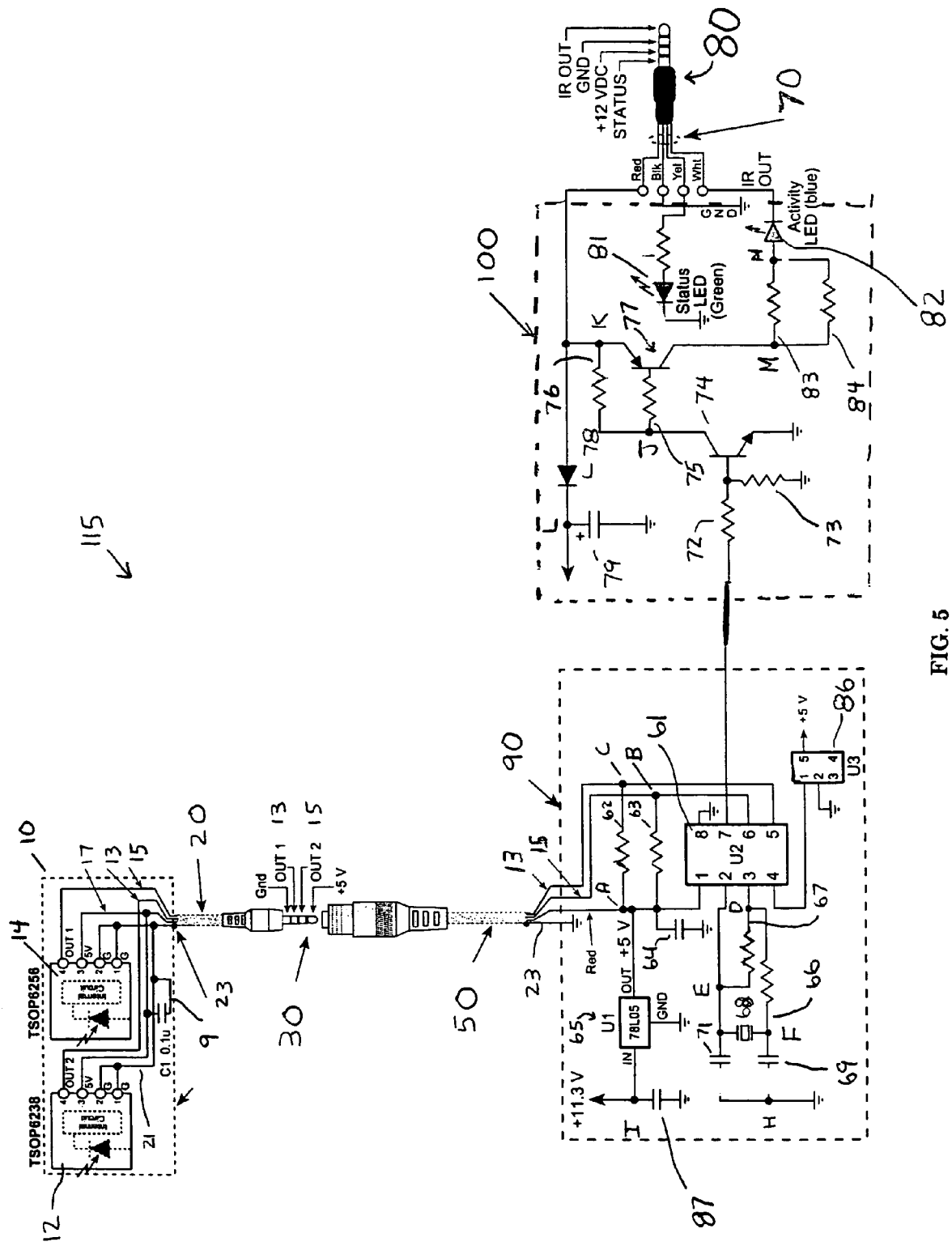
FIG. 5 is a simplified electrical schematic diagram of one implementation of the IR receiver shown in FIG. 3.

FIG. 5 is a simplified electrical schematic diagram of one implementation of the IR repeater system shown in FIG. 3. This IR repeater system 115 includes a dual receiver pickup module 10 coupled to a controller unit 90 that is coupled to an amplifier 100.

In FIG. 5, the first receiver module 12 includes one or more sensors and internal circuitry. The sensors may be, for example, comprised of one or more silicon PIN photodiodes capable of detecting optical energy within a defined spectral range that passes through a filter. In a multiple sensor configuration, multiple sensors (including, optionally, all of the sensors) may be imprinted together on a single die or each sensor from a respective die.

The internal circuitry includes a narrowly tuned bandpass filter (not shown) that is configured to allow only the light in a narrow infrared range to pass through the photo diode. For example, an IR bandpass filter may be utilized that provides an optical bandpass characteristic suitable for transmitting a desired IR optical wavelength, while filtering out most IR noise or interference prior to the conversion of the optical wavelengths to electrical signals. In this example, the electrical filter of the first receiver module is tuned to a first frequency such as 38 kHz, whereas the electrical filter of the second receiver module is tuned to a second frequency such as 56 kHz.

The internal circuitry block of the first receiver module 12 shown in FIG. 5 typically also includes a narrow band-pass, ac-coupled amplifier that amplifies the weak output of a photodiode, an automatic gain controller unit that suppresses ambient infrared noise from passing to the final stages of the amplifier, and carrier demodulation circuitry that demodulates the carrier signal.

The second receiver module 14 is of a similar construction, however, the filter could be tuned to a different frequency such as 56 kHz. The first and second receiver modules 12, 14 could be implemented, for example, using VISHAY SM receiver module part nos. TSOP6238 (the 38 KHz receiver) and TSOP6256 (the 56 KHz receiver). Other receiver modules produced by other manufacturers could also be utilized. In addition, one of skill in the art will appreciate that receiver modules tuned to other frequencies, such as a 455 KHz, could also be implemented depending on the requirements of the repeater system.

The first and second receiver modules 12,14 both have grounded outputs 21 and a 5-volt output 17. The grounded outputs 21 are commonly connected to a cable shield of the shielded three-conductor cable 20. The pickup module 10 includes an electromagnetic interference (EMI) shield, represented by the rectangular-shaped dotted line, which is connected to the cable shield. The grounded outputs of the first and second receiver modules 12,14 are connected to the cable shield 23 of shielded cable 20. The grounded outputs are capacitively coupled to the 5-volt output of the receiver modules 12, 14 by decoupling capacitor 16. Capacitor 16 stabilizes the power supplied to the receiver modules 12, 14 and reduces noise. The 5V outputs of the first and second receiver modules 12, 14 are connected to one of the conductors in the three-conductor shielded cable 20.

The receiver modules 12, 14 generate logic level output signals 13, 15 that, if desired, can be directly input to a microprocessor of a component to be controlled. In this case, however, the logic level output signals 13,15 of the first and second receiver modules 12,14, respectively, are each separately input into shielded cable 20 so that the controller 61 can analyze the outputs of the first and second receiver modules 12,14 separately. As discussed above, this can result in less signal error caused by timing differences between the outputs of the first and second receiver modules 12,14.

These logic level output signals 13, 15 are not typically synchronized with the module's IR input signal, but are typically delayed about 4 to 10 carrier cycle periods with respect to the IR input signal. The initial delay and overall matching between the IR input signal and output signal burst 13, 15 varies with respect to signal strength, carrier frequency, and characteristics of the particular modules that vary from manufacturer to manufacturer. The receiver modules compensate for this delay by continuing to generate the logic level output signal for a duration equivalent to the delay inserted at the beginning of the IR signal.

As noted above, these receiver modules 12, 14 generally provide good noise rejection, but are not 100% effective, and therefore further signal processing is sometimes necessary to ensure that the IR output signal is in fact a valid remote control command.

The three-conductor shielded cable 20 has a ground output 23, a 5 volt output 17, the logic level output signal 13 of the first receiver module 12, and the logic level output signal 15 of the second receiver module 14. The first plug 30 is coupled to jack 40 that passes these signals via the three-conductor shielded cable 50 to the controller unit 90. Alternatively, the outputs of the pickup module could be directly coupled into the controller unit 90 using a single cable, using more than two cables, by using a coupling device as shown, or included in one module with the controller and output modules.

The controller unit 90 includes resistors 62,63; capacitor 64; regulator circuit that includes a five volt regulator 65 and capacitor 87; a clock circuit that includes resistors 66,67, crystal oscillator 68, and capacitors 69,71; and optionally a monitor 86.

The grounded output signal 23 of the three-conductor shielded cable 50 is at ground potential. The 5-volt output 17 is coupled to node A, the logic level output signal of the second receiver module 15 is coupled to node B, and the logic level output signal of the first receiver module 13 is coupled to node C. The resistor 62 is coupled between nodes A and C, while resistor 63 is coupled between nodes A and B. A capacitor 64 is also coupled between node A and ground.

The controller or microprocessor 61 that is shown has 8 pins, however, other controllers or microprocessors could also be utilized that have a higher or lower pin count.

Pin 1 of the controller 61 is coupled to node A, pin 8 is grounded, pin 5 is coupled to node C and receives the logic level output signal 13 generated by the first receiver module 12, and pin 6 is coupled to node B and receives the logical level output signal 15 generated by the second receiver module 14.

The clocking circuit includes resistor 67 coupled between nodes E and D, a resistor 66 coupled between nodes F and D, a 12 MHz SMD crystal oscillator 68 coupled between nodes E and F, capacitor 69 coupled between node F and H, and capacitor 71 coupled between nodes E and H. Node H is at ground potential. Pins 2 and 3 are coupled to nodes E and B, respectively, and receive a clocking signal generated by the clock circuit.

Regulator 65 receives a 12 volt input signal at node I which is coupled to a grounded capacitor 87. Regulator 65 maintains the signal input to pin 1 (node A) at five volts.

Pin 4 is coupled to the monitoring unit 86 that monitors the voltage of the controller 61 to detect voltage variations. The monitoring unit 86 resets the controller 61 if the voltage falls below a pre-determined voltage.

The controller unit 61 generates a remote control command signal that is a replica of a valid remote control command received at one of the receiver modules 12, 14, and outputs the remote control command signal to the amplifier 100 via pin 7, as discussed above with respect to controller unit 90.

An implementation of one embodiment of the amplifier 100 includes a voltage divider circuit that includes resistors 72 and 73, transistor 74, resistors 75,76, transistor 77, diode 78, capacitor 79, four connector plug 80, light emitting diodes (LEDs) 81,82, and resistors 83,84,85.

The voltage divider circuit receives a remote control command signal from the controller unit 61 that is a replica of a valid remote control command received at one or both of the receiver modules 12, 14. The voltage divider 72,73 divides its voltage and outputs a signal that drives the base electrode of transistor 74. The emitter of transistor 74 is grounded and the collector of the transistor 74 is coupled to resistors 75, 76 at node J. The signal at node J is then coupled to the base of transistor 77 via resistor 75, and to the emitter of transistor 77 via resistor 76 at node K which is connected between the anode of diode 78 and the 12-volt output of four-conductor cable connected to plug 80. The cathode of diode 78 is coupled to node L which is also connected to a capacitor 79 which provides a positive filtered voltage supply for node I, module 90. Capacitor 79 is coupled between node L and ground. The anode of diode 78 is coupled to node K. Power Supply Voltage at node K is +12 volts and is obtained as an input (Red) from plug 80. Another output (Blk) of plug 80 is at ground. LED 81 is coupled to resistor 85 to generate a status input (Yel) from plug 80.

The collector of the transistor 77 generates an amplified version of the remote control command signal that is output from the controller unit 90, and couples that signal to a resistive network that includes resistors 83 and 84 connected in parallel between nodes M and N. The amplified version of the remote control command signal is input to the anode of activity light-emitting diode 82 at node N. The cathode of activity light-emitting diode 82 is coupled to the IR output signal conductor (Wht) of the four-conductor plug 80. The amplifier 100 can be coupled to a mating quad mini phone jack on a Connecting Terminating Block, similar to 140 of FIG. 3, via the quad mini plug 80 and four-conductor ribbon cable 70.

Thus, the quad mini phone connector 80 includes four circuits comprising a status input, a twelve volt DC input, a ground output and an infrared (IR) signal output. The IR repeater 115 receives input signals at the dual receiver pickup module 10, confirms that at least one of the input signals correspond to a carrier of valid remote control command burst, and if the input signal is valid, generates a carrier signal that corresponds to the input signal, and outputs the carrier signal at the IR output of plug 80.

Figure 6:
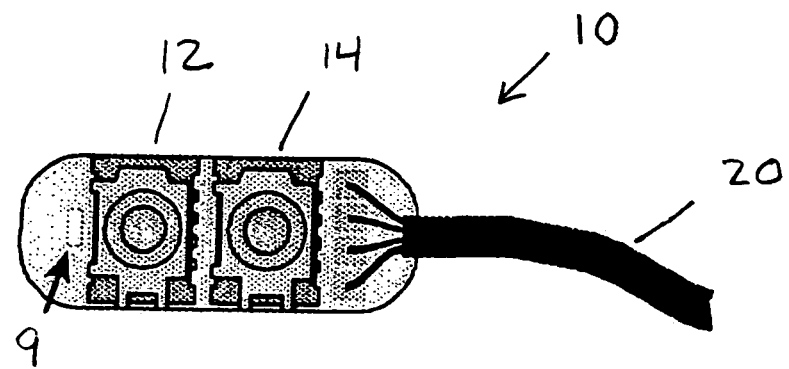
FIG. 6 is a top view of an embodiment of a dual receiver pick-up module shown in FIG. 5 without shielding or casing in place.

FIG. 6 is a top view of an embodiment of a dual receiver pick-up module shown in FIG. 5 without shielding or casing in place. The pickup module 10 includes a first receiver module 12, a second receiver module 14 and capacitor 9. The dual receiver pickup module 10 may be coupled to a plug 30 via a three-conductor shielded cable 20. The plug is mateable with a jack 40 to form an inline quad mini connector. The jack 40 is coupled to a second cable 50 that connects the jack 40 to the controller unit 90. Alternatively, the dual receiver pickup module 10 may be directly coupled to the controller unit 90 by, for example, a single cable or wireless connection.

Figure 7:
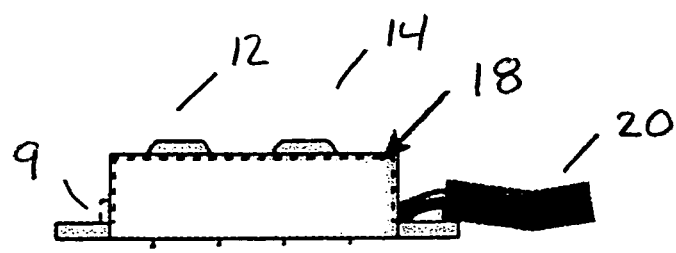
FIG. 7 is a side view of the dual receiver pick-up module shown in FIG. 6 with shielding in place.

FIG. 7 is a side view of the dual receiver pick-up module shown in FIG. 6 with shielding 18 in place. The shielding 18 prevents electromagnetic interference from leaking into or out of the first and second receiver modules 12, 14. One end of the shielding 18 can be notched to provide clearance for the capacitor 16 while the other end of the shielding 18 can notched to provide clearance for the leads of the first cable 20. The shielding 18 also includes openings that are sufficient to allow the infrared lenses of the first receiver module 12 and second receiver module 14 to be exposed through the shielding 18. The shielding 18 may be comprised, for example, of tin or another similar metal so that the bottom edge of the shielding 18 may be soldered to copper foil on a printed circuit board. As shown, once the shielding 18 is in place, the infrared lenses of the first and second receiver modules 12,14 protrude slightly from the shielding 18. Although not shown, the pickup module 10 may be subsequently encased, for example, in IR passing type material.

Figure 8:
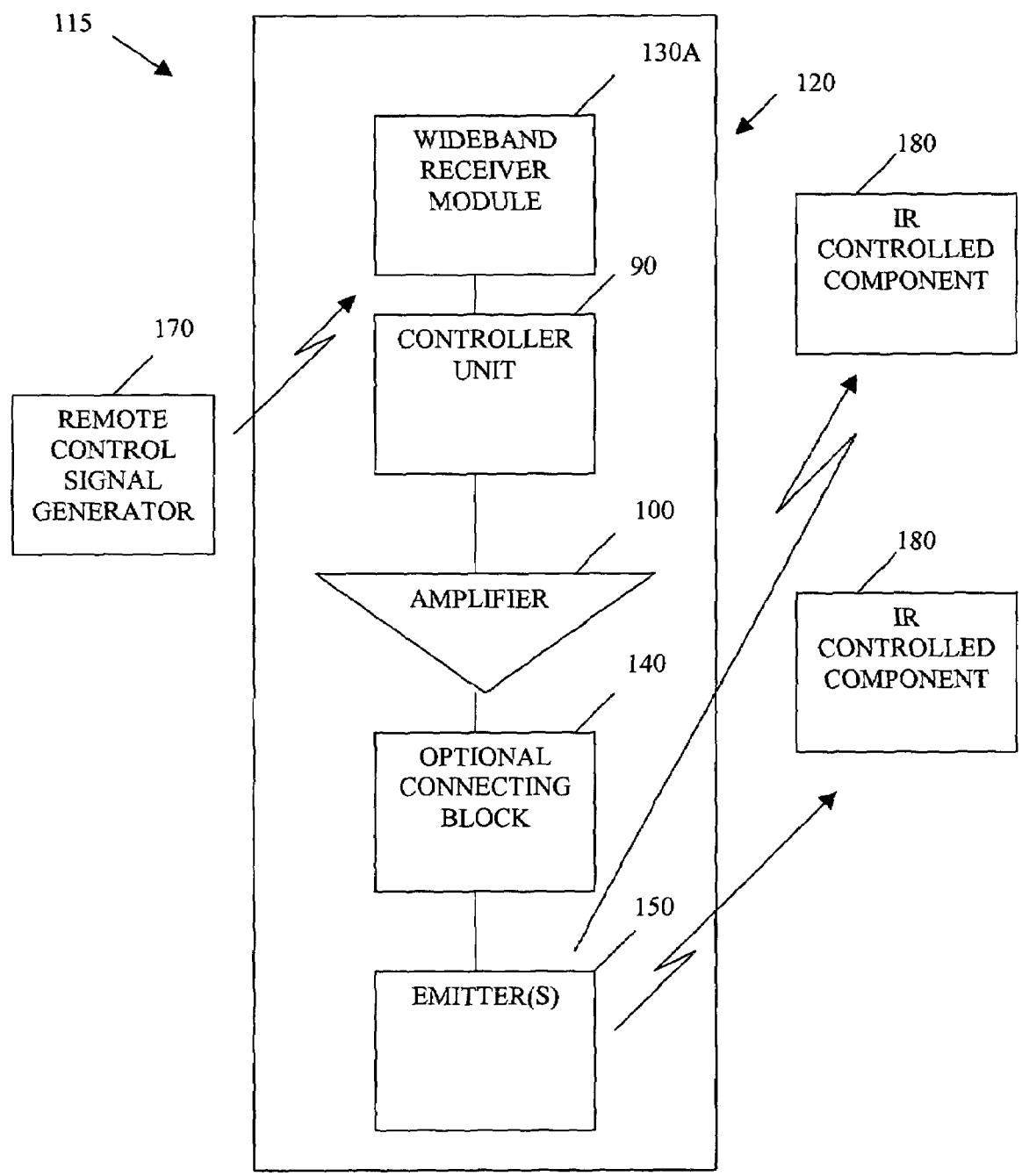
FIG. 8 is a simplified block diagram of an embodiment of the IR repeater system that utilizes a wide-band receiver module.

FIG. 8 is a simplified electrical schematic diagram of an embodiment of the IR repeater system shown in FIG. 2 that utilizes a wide-band receiver module.

Because the narrow band receiver modules discussed above are manufactured for applications other than repeater systems, the demodulator of the narrow band receiver module removes valuable carrier information from the incoming IR input signal that could be used by the controller unit 90 to determine whether the incoming IR input signal is in fact a valid remote control command.

In this embodiment, the IR receiver is a wideband receiver capable of detecting a wide-band of modulated IR frequencies so as to be compatible with a wider variety of IR controlled components. The controller unit 90 allows the repeater system to maintain sufficient selectivity so as to be resistant and in many cases immune to stray IR radiation interference.

The wideband receiver module differs from the narrowband receiver module in that it covers a much greater range of frequencies (e.g., 24 kHz to 100 kHz). Moreover, the wideband receiver module of this embodiment does not include a demodulator and therefore the output signal of the wideband receiver module is not a stripped carrier signal. Instead, the output signal of the wideband receiver module closely resembles the incoming IR input signal and includes carrier information that can be utilized by the controller unit 90 during post processing of the output signal. Because the signal generated by the wide band receiver module includes much more information than signals generated by the narrow band receiver modules, the controller unit 90 is able to conduct significantly more processing. For example, the controller unit 90 can analyze carrier timings such as the duty cycle of the carrier signal, and other information that is not present in the stripped carrier output signal of a narrow-band receiver module.

To simplify processing, the controller unit 90 may reject incoming IR signals that fail to meet certain criteria. For example, the controller unit 90 may reject incoming IR signals that are either below a 32 kHz carrier frequency, or above a 60 kHz carrier, by more than a given frequency tolerance. The controller unit 90 may also reject incoming signals that do not have a uniform duty-cycle since IR carriers generated by remote controls have uniform carrier cycles as opposed to noise, which typically has a more random duty-cycle.

In addition to timing threshold information that is output by a narrow-band receiver module, the output of the wideband receiver also includes information about the actual timing of the carrier that can be used to make determinations whether the output signal is actually part of a valid remote control command, as opposed to noise. For example, the output of the wideband receiver also includes information about the timing of the entire carrier burst that can be used to make determinations whether the output signal is actually part of a valid remote control command. Carrier signals generated by a transmitter will be uniform, in both frequency and duty cycle, throughout the carrier burst signal. Random noise, caused by ambient IR noise, will generally not be equivalent to the uniform carrier signal that a transmitter produces. This fact allows the controller unit 90 to better discriminate noise from real remote signals.

The wideband receiver module preferably incorporates automatic gain control circuitry for discriminating between a remote control signal input and IR light emitted from constant ambient IR noise sources such as compact fluorescent lights (CFLs), ambient light levels, and even direct sunlight. This circuitry would be similar to that utilized in the narrow band receiver modules. This would result in a single receiver module that could eliminate noise from both plasma sources and constant ambient IR noise sources such as CFLs.

It is to be understood that the above description is intended to be illustrative, and not restrictive. Many other embodiments will be apparent to those of skill in the art upon reading and understanding the above description. For example, although the repeater system shown in FIG. 5 utilizes distinct circuits for the receiver modules, controller unit, and amplifier, the repeater system could be implemented in a single unit such as on a single circuit board or in a single microchip. Although, the dual receiver pickup module 10 in FIG. 5 shows only two receiver modules 12, 14, it will be appreciated that the pickup module 10 could accommodate a single receiver module or a plurality of receiver modules in other embodiments. The schematic shown in FIG. 5 includes only two infrared receiver modules 12, 14 for simplicity of discussion. As such, the scope of the invention should be determined with reference to the appended claims, along with the full scope of equivalents to which such claims are entitled.

What is claimed is:

1. A repeater unit comprising:
   at least one receiver module responsive to an infrared signal; and
   a controller unit adapted to determine whether a signal based on the infrared signal corresponds to one of a plurality of remote control signals,
   wherein the at least one receiver module comprises a first receiver module, tuned to a first carrier frequency, that receives the infrared signal and is configured to generate a first signal based on the infrared signal, and a second receiver module, tuned to a second carrier frequency, that receives the infrared signal and is configured to generate a second signal based on the infrared input signal,
   wherein the controller unit:
   determines if the first signal based on the infrared signal is a valid remote control signal by determining if the first signal corresponds to one of the remote control signals, or
   determines if the second signal based on the infrared signal is a valid remote control signal by determining if the second signal corresponds to one of the remote control signals; and
   generates a signal that corresponds to one of the remote control signals, if the controller unit determines that either the first signal or the second signal is a valid remote control signal, by adding either a fixed carrier frequency, or a multi frequency signal to either the first signal or the second signal,
   wherein the controller unit determines if the first signal corresponds to one of the remote control signals by measuring a pulse width of the first signal, and determining if the pulse width of the first signal is greater or less than a predetermined duration that corresponds to a duration of a carrier of one of the remote control signals,
   wherein the controller determines that the second signal corresponds to one of the remote control signals by measuring a pulse width of the second signal, and determining if the pulse width of the second signal is greater or less than a predetermined duration that corresponds to a duration of a carrier of one of the remote control signals, and
   wherein the controller unit determines that either the first signal or the second signal corresponds to one of the remote control signals, even though the pulse width of the first output signal or the second signal is less than the predetermined duration, if the first signal and the second signal are simultaneously active.

2. The repeater unit of claim 1, wherein the infrared signal comprises at least one of a noise input and the remote control signal.

3. The repeater unit of claim 2, wherein the controller unit is adapted to distinguish between the noise input and the remote control signal.

4. The repeater unit of claim 1, wherein the first and second receiver modules comprise wideband receiver modules.

5. The repeater unit of claim 1, wherein the first and second receiver modules comprise narrowband receiver modules.

6. The repeater unit of claim 1, further comprising an amplifier that amplifies the signal generated by the controller unit.

7. The repeater unit of claim 1, wherein the infrared signal is from a control device.

8. The repeater unit of claim 7, wherein the control device is a remote control device.

9. The repeater unit of claim 1, wherein the first carrier frequency is centered about 38 kHz.

10. The repeater unit of claim 9, wherein the second carrier frequency is centered about 56 kHz.

11. The repeater unit of claim 1, further comprising a third receiver module tuned to a third carrier frequency that receives the infrared signal and is configured to generate a third signal based on the infrared input signal.

12. The repeater unit of claim 11, wherein the third carrier frequency is centered about 455 kHz.

13. An infrared repeater system comprising the repeater unit of claim 1, and further comprising:
   a remote control device that generates the infrared signal;
   an amplifier that amplifies the signal generated by the controller unit; and
   at least one component responsive to the amplified output signal from the amplifier.

* * * * *